United States Patent
Pascoe et al.

(10) Patent No.: US 7,207,110 B2
(45) Date of Patent: Apr. 24, 2007

(54) DIFFERENTIAL HOUSING WITH INTEGRATED RING GEAR

(75) Inventors: David Mark Pascoe, Newmarket (CA); David Dorigo, Oakville (CA); Cheng Mu, Toronto (CA); Jianwen Li, Toronto (CA)

(73) Assignee: Tesma International Inc., Concord, Ontario (CA)

( * ) Notice: Subject to any disclaimer, the term of this patent is extended or adjusted under 35 U.S.C. 154(b) by 284 days.

(21) Appl. No.: 10/726,159

(22) Filed: Dec. 2, 2003

(65) Prior Publication Data

US 2004/0134307 A1 Jul. 15, 2004

Related U.S. Application Data

(60) Provisional application No. 60/430,488, filed on Dec. 2, 2002.

(51) Int. Cl.
*B21K 1/30* (2006.01)
*B23P 15/14* (2006.01)
*F16H 57/02* (2006.01)

(52) U.S. Cl. ............... 29/893.2; 29/893.3; 29/893.34; 29/893.35; 475/230; 74/606 R

(58) Field of Classification Search ............. 29/893.34, 29/893.2, 893.3, 893.35; 475/230; 74/606 R
See application file for complete search history.

(56) References Cited

U.S. PATENT DOCUMENTS

| | | | |
|---|---|---|---|
| 1,400,949 A | 12/1921 | Frey | |
| 1,657,510 A | 1/1928 | Leipert | |
| 1,678,942 A | 7/1928 | Holmes | |
| 2,510,996 A | 6/1950 | Morgan | |
| 4,817,753 A * | 4/1989 | Hiketa | ........................ 180/249 |
| 5,106,350 A | 4/1992 | Beton | |
| 5,233,757 A | 8/1993 | Maguire | |
| 5,286,239 A | 2/1994 | Ito et al. | |
| 6,061,907 A | 5/2000 | Victoria et al. | |
| 6,146,304 A * | 11/2000 | Bendtsen | ..................... 475/230 |
| 6,176,152 B1 | 1/2001 | Victoria et al. | |
| 6,351,886 B1 * | 3/2002 | Hasegawa | ................ 29/893.32 |
| 6,354,978 B1 * | 3/2002 | Brackin et al. | ............. 475/234 |
| 6,689,009 B1 * | 2/2004 | Fett | ............................ 475/230 |
| 6,835,155 B2 * | 12/2004 | Busch et al. | ................ 475/231 |
| 6,883,235 B2 * | 4/2005 | Bell | ......................... 29/893.1 |
| 6,945,898 B2 * | 9/2005 | Szuba | ........................ 475/230 |
| 7,048,668 B2 * | 5/2006 | Busch et al. | ................ 475/231 |
| 2004/0045389 A1 * | 3/2004 | Pascoe | ........................ 74/434 |
| 2005/0070394 A1 * | 3/2005 | Sugeta et al. | ............... 475/230 |
| 2006/0143917 A1 * | 7/2006 | Lindsay et al. | .......... 29/893.34 |

FOREIGN PATENT DOCUMENTS

| | | | |
|---|---|---|---|
| EP | 1624229 A1 | * | 2/2006 |
| JP | 62-132055 | * | 6/1987 |
| JP | 64-018545 | * | 1/1989 |
| JP | 02-133141 | * | 5/1990 |
| JP | 04-366028 | * | 12/1992 |
| JP | 09-229162 | * | 9/1997 |
| JP | 11-072158 | * | 3/1999 |
| JP | 2000-266162 | * | 9/2000 |
| WO | 2004/028722 | * | 4/2004 |

* cited by examiner

*Primary Examiner*—Essama Omgba
(74) *Attorney, Agent, or Firm*—Clark Hill PLC

(57) ABSTRACT

A method is disclosed for making a differential housing having a ring gear integrally formed therein. The method includes the steps of forging a conical frustum from a steel rod; deforming the frustum between upper and lower die halves of a tool to produce a differential housing having an annular rim; and forging a plurality of teeth in the annular rim defining the rim gear.

7 Claims, 9 Drawing Sheets

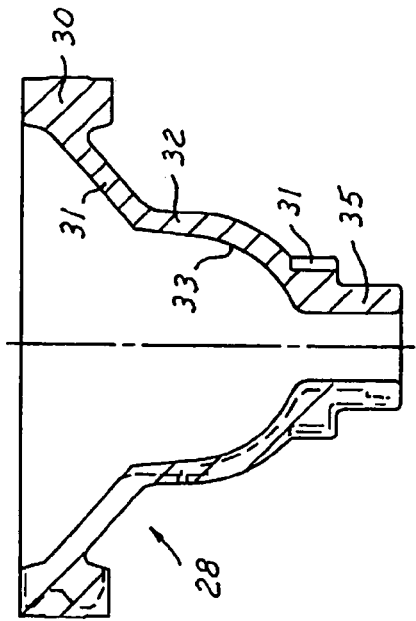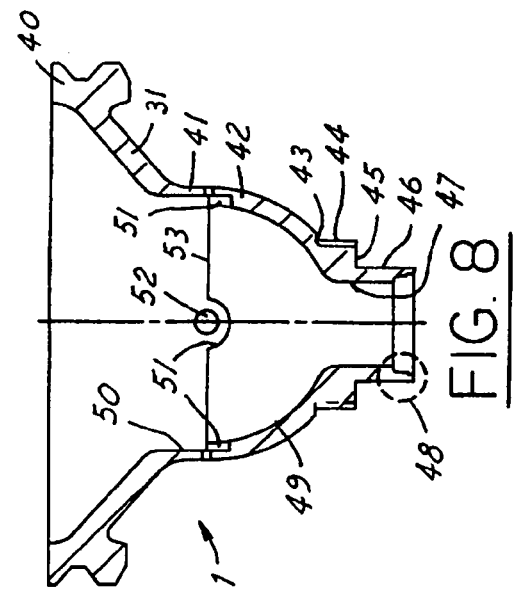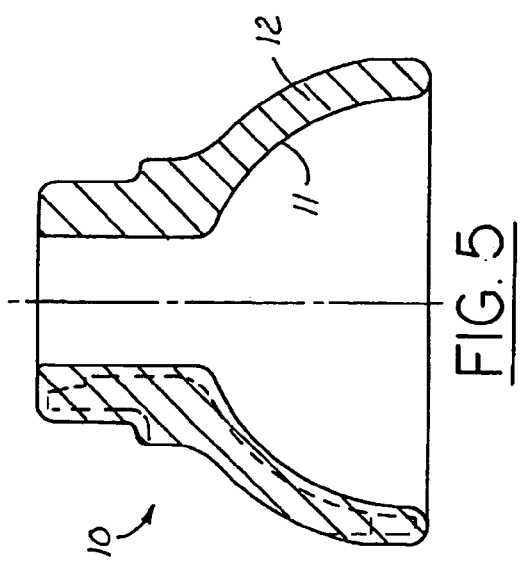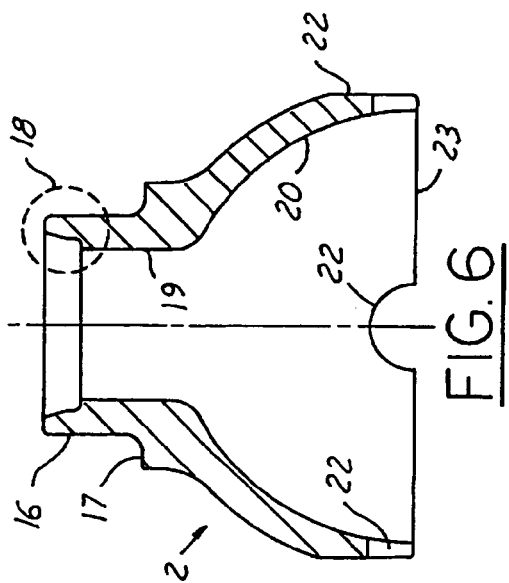

DIFFERENTIAL HOUSING WITH INTEGRATED RING GEAR

RELATED APPLICATION

This application claims priority to and all the benefits of U.S. Provisional Application No. 60/430,488, filed on Dec. 2, 2002.

BACKGROUND OF THE INVENTION

1. Field of the Invention

The invention relates to transaxles for an automotive vehicle, and more particularly, to a differential housing with an integrated ring gear and a method of forming the housing with the ring gear integrated therewith.

2. Description of the Related Art

Differential mechanisms are widely used in drive axles in automobiles for transmitting torque from an engine driven transmission output to left and right axle shaft for transferring force to wheels secured to the ends of the axle shafts. The differential mechanism typically includes a plurality of gears for allowing the left and right axle shafts to rotate at different speeds while still transmitting torque to the wheels driven by the axle shafts.

Conventional differential mechanisms include an outer housing and a separate ring gear fixedly secured to the outer housing. Producing separate housings and rings gears and later interconnecting the ring gears to the housings requires numerous machining and welding operations. Conventional welding operations generate heat in an amount sufficient to distort the housing and the ring gear.

Accordingly, it remains desirable to have a method of forming a differential housing having a ring gear integrally formed therein without the need to weld together a housing and a ring gear.

SUMMARY OF THE INVENTION

According to one aspect of the invention, a method is disclosed for making a differential housing having a ring gear integrally formed therein. The method includes the steps of forging a conical frustum from a steel rod; deforming the frustum between upper and lower die halves of a tool to produce a differential housing having an annular rim; and forging a plurality of teeth in the annular rim defining the ring gear.

According to another aspect of the invention, a differential housing is also disclosed. The housing comprises a bell shaped body extending between a cylindrical first end and an opposing annular second end, and a ring gear integrally formed in the opposing annular second end.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is a cross sectional view of a housing cover preform;

FIG. 6 is a cross sectional view of a housing cover of the differential assembly formed from the preform shown in FIG. 5;

FIG. 7 is a cross sectional view of a housing preform;

FIG. 8 is a cross sectional view of a housing of the differential assembly formed from the preform shown in FIG. 7;

DETAILED DESCRIPTION OF THE PREFERRED EMBODIMENTS

Figure 1:
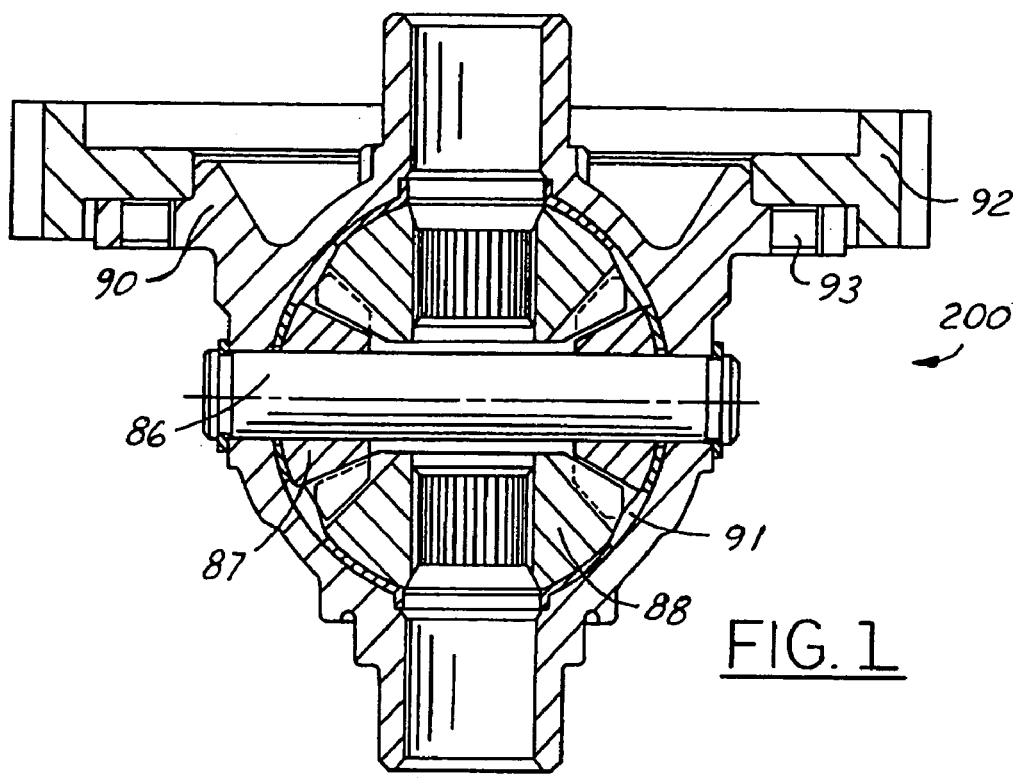
FIG. 1 is a cross sectional view of a prior art differential assembly.

Referring to FIG. 1 there is shown a conventional prior art differential assembly 200 for transmitting torque from a transmission to axle shafts of driven wheels allowing the two wheels to rotate at different speeds. The conventional differential assembly 200 includes a housing 90 formed from a one-piece iron casting having two wide-open windows 91 for installing a subassembly of internal bevel gears and pinions. A ring gear 92 is fixedly secured to the housing 90 by bolts 93, rivets or other suitable attachment means. The ring gear 92 is driven by torque provided by a transmission output pinion gear (not shown). The torque is then transmitted through the housing 90 to the pinion shaft 86, which carries bevel pinions 87 in rotation. Finally, axle shafts are driven through bevel gears 88, which mesh with the bevel pinions 87.

Figure 2:
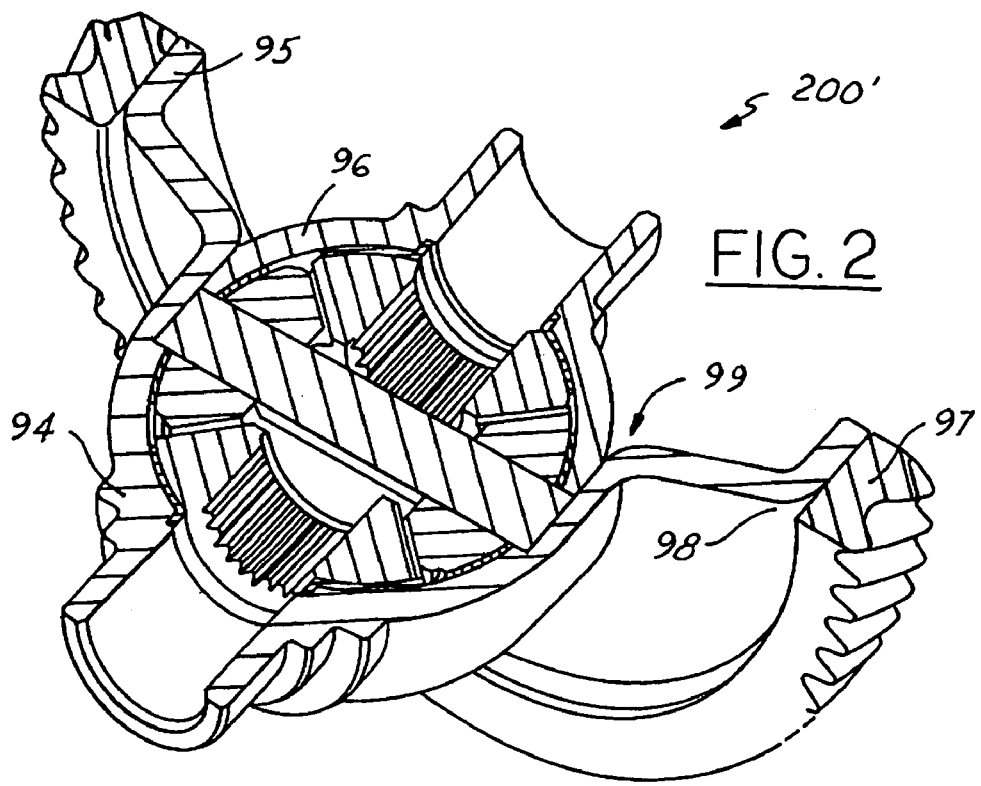
FIG. 2 is a perspective view, partially cut away, of a second prior art differential assembly.

FIG. 2 illustrates another conventional prior art differential assembly 200'. The differential housing includes a flow-formed or spin-formed housing 94 and housing cover 96, which are interconnected mutually by laser welding, or other suitable interconnecting means. A ring gear 97 is fixedly secured to a flange 95 of the housing 94 by welding. Bevel gears, bevel pinions, a pinion shaft and washers 19 are installed inside the housing.

Figure 3A:
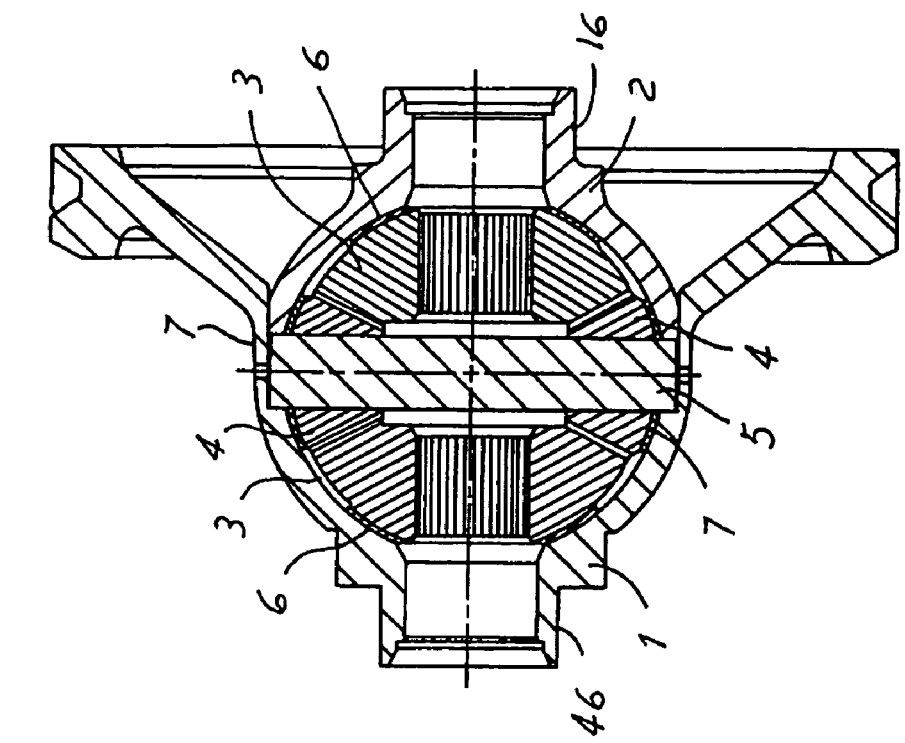
FIGS. 3a and 3b are perspective and cross sectional views, respectively, of a differential assembly according to one embodiment of the invention.
Figure 3B:
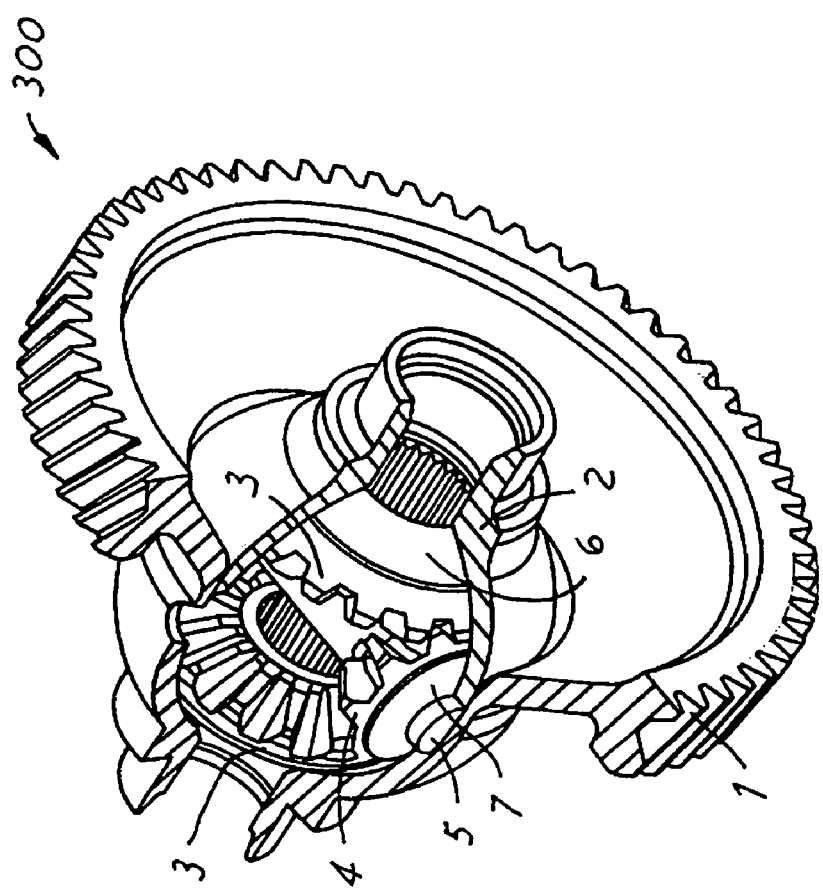
Figure 4A:
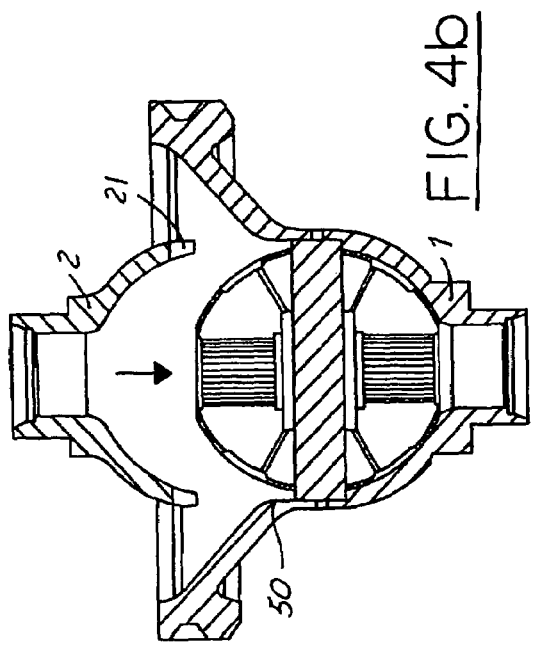
FIGS. 4a–d are cross sectional views of the differential assembly.
Figure 4B:
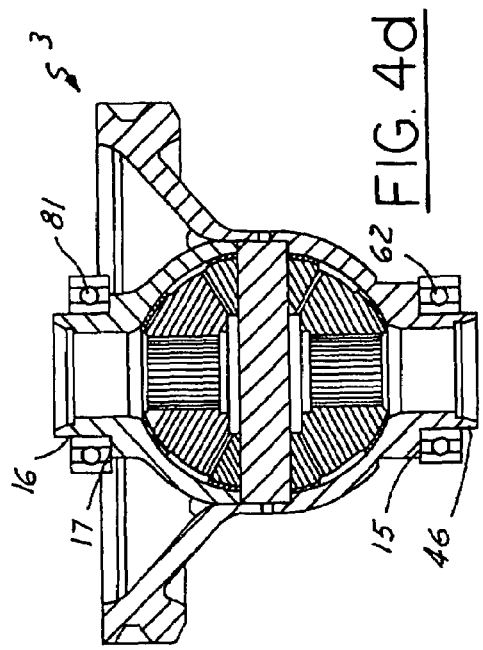
Figure 4C:
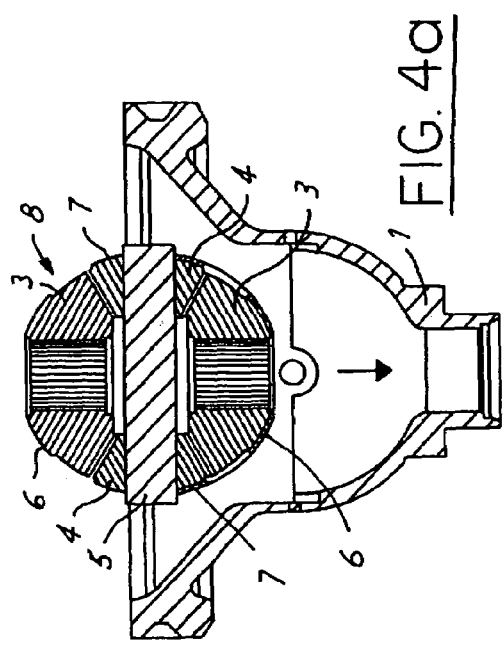
Figure 4D:
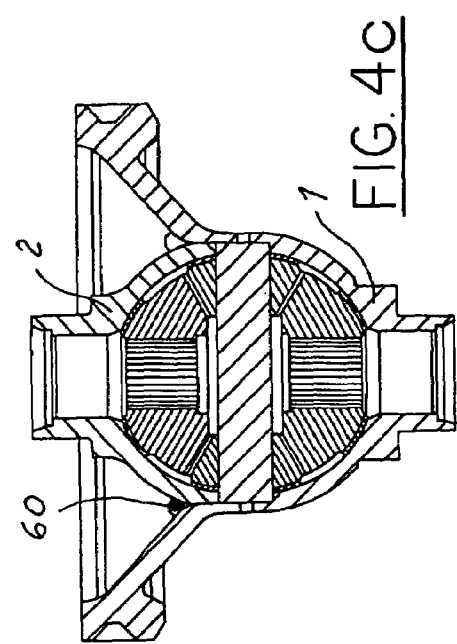

Referring to FIGS. 3a and 3b, a differential assembly is generally indicated at 300 according to one embodiment of the invention. Torque from a transmission (not shown) is transmitted through a differential gear and housing 1 preferably formed in a forging operation, as will be described in detail below. The torque is transferred to a bevel pinion shaft 5, which, in turn, drives a pair of bevel pinions 4. Torque from bevel pinions 4 is transmitted to a pair of bevel gears 3, which are interconnected to left, and right axle shafts (not shown) through a spline formed in an internal diameter of the bevel gears 3. The bevel pinion shaft 5, bevel pinions 4, and bevel gears 3 are assembled between the differential housing 1 and differential housing cover 2. In a preferred aspect of the present invention, the differential housing 1 and cover 2 are formed in a forging operation. The housing cover 2 provides a support 16 for a bearing (not shown) linked to the differential assembly 300. A second support 46, similar to the first support 16 is formed on an opposing side of the housing 1. A pair of bevel pinion washers 7 and bevel gear washers 6 are assembled between the bevel pinions 4 and bevel gears 5 and inside surface 53 of the housing.

Figure 15:
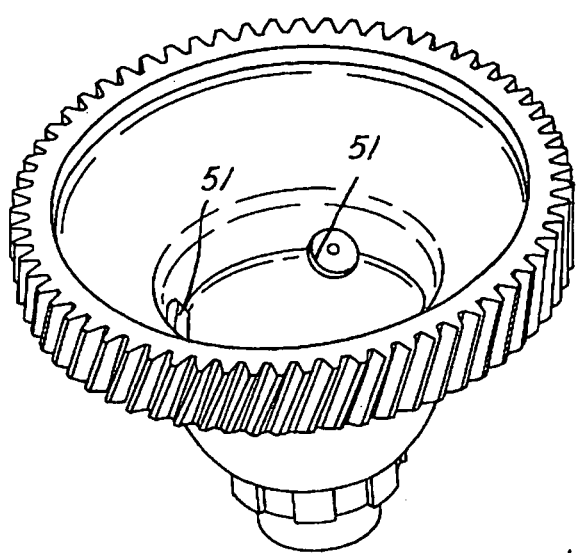
FIG. 15 is a perspective view of the housing according to the first embodiment.

FIGS. 4a–d illustrate preferred steps for assembling the differential assembly 300. In a first step, a subassembly 8 including the bevel gears 3, bevel pinions 4 meshed with the bevel gears 3, washers 6 and 7 covering spherical surfaces of bevel gears 3 and pinions 4, and the bevel pinion shaft 5 inserted into holes formed in two bevel pinions 4 as well as the washers 7 are installed inside of the differential housing 1. Each end of the bevel pinion shaft 5 is seated within a semi-circular recess 51 formed in the housing 1 that is best shown in FIG. 15.

Figure 16:
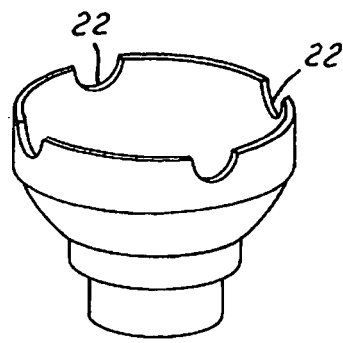
FIG. 16 is a perspective view of the housing cover according to the first embodiment.

In a second step, an external cylindrical surface 21 of the housing cover 2 is fitted within the internal cylindrical surface 50 of the housing 1. The housing cover 2 includes semi-circular recesses 22, as best shown in FIG. 16, to accommodate respective ends of each bevel pinion shaft 5.

In a third step, the housing 1 and the housing cover 2 are interconnected by welding, or other suitable methods known by those skilled in the art.

In a fourth step, radial ball bearings 61 and 62 or tapered roller bearings are fitted on journals 16, 46 formed in the housing cover 2 adjacent shoulder 17, 45 respectively.

Because the torque transmitted through the differential assembly 300 is very high, the differential assembly 300 may include three or four pinions 4 supported on the housing 1 using pinion shafts 5, meshing with the bevel gears 3 and spaced mutually about a central axis.

Referring to FIG. 5, there is shown a preferred forged housing cover preform 10. The housing cover preform 10 includes a wall 12 and an inner spherical surface 11. The dotted line shown indicates an intended final shape of the housing cover 2 after machining.

FIG. 6 shows a cross section of the preferred housing cover 2, which is machined from the housing cover preform 10 shown in FIG. 5. The machining step includes forming a journal surface 16 and shoulder used to install bearing 61. The machining step also includes forming an internal cylindrical surface 19 for allowing insertion of an axle shaft. The machining step also includes forming an internal spherical surface 20 to receive the bevel gears 3, bevel pinions 4, and washers 7, as previously described above. Additionally, the machining step includes forming an external cylindrical surface 21, a circular surface 23 and semi-circular recesses 22 in the preform 10 to produce the housing cover 2.

Referring to FIG. 7, there is shown a cross section of a forged housing preform 28 including an integrated gear region. The gear region includes a gear rim area 30, support area 31, wall 32, internal spherical area 33, speed-sensor teeth 34 and bearing area 35. The dotted line indicates an intended final shape of the housing 1 after machining.

Referring to FIG. 8, the housing 1 is shown, which was machined from the housing preform 28 shown in FIG. 7. A journal surface 46 and shoulder 45 are formed in the machining step for installing bearing 62: Also an outside diameter 44 of speed-sensor teeth 34, a shoulder 43 and an area 48 are formed in the machining step. An internal spherical surface 49 for installing bevel gears 3, pinions 4 and washers 7 is also formed in the: machining step. An internal cylindrical surface 50, circular surface 53 and semi-circular recesses 51 are also formed in the machining step. Gear teeth 40 are cut and lubrication oil holes 52 are drilled and reamed as part of the machining step used to form the housing 1.

Figure 9A:
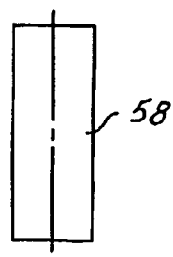
FIGS. 9a–9f are of cross sectional views of the housing illustrating the sequence of the method of forming the housing.
Figure 9B:
Figure 9C:
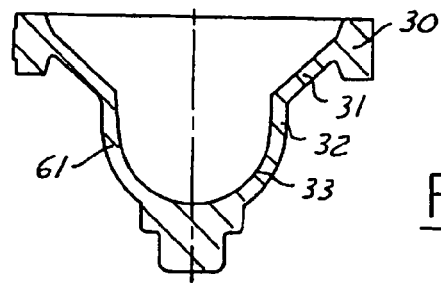
Figure 9D:
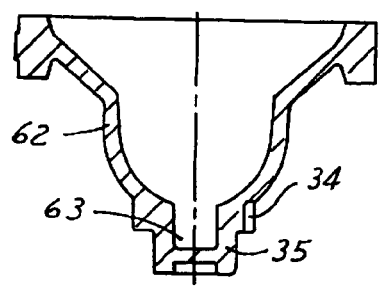
Figure 9E:
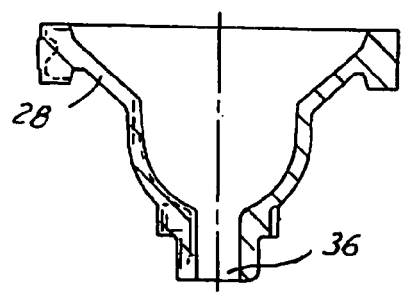
Figure 9F:
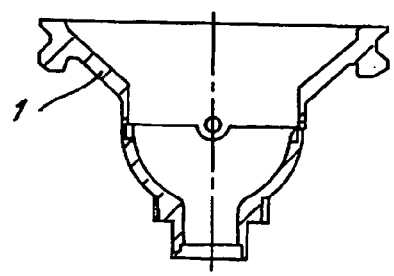

Referring to FIGS. 9a–f there is shown preferred steps for forging the housing preform 28 and machining the preform 28 to form the housing 1. In a first step a steel rod 58 is forged into a conical frustum 60, shown in FIG. 9b. In a second step, frustum 60 is then formed by punch and die operations into a primary preform 61 having the gear rim area 30, support area 31, wall 32, and internal spherical area 33, as shown in FIG. 9c. In a third step, the primary perform 61 is forged into workpiece 62, shown in FIG. 9b, having speed-sensor teeth 34, area 35 and a blind hole 63 formed by the punch and die operations. In a fourth step, the blind hole 63 is pierced forming hole 36 of the housing preform 28. In a fifth step, the preform 28 is machined forming gear teeth 40. In a sixth step, the preform 28 is heat-treated and finish machined or ground to final dimensions forming the housing 1, shown in FIG. 9f.

Figure 10A:
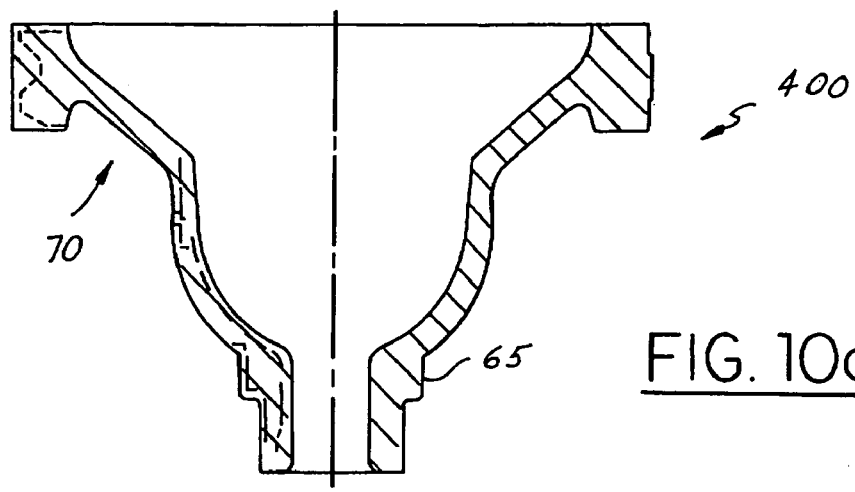
FIGS. 10a–c are cross sectional views of a second embodiment of the differential housing.
Figure 10B:
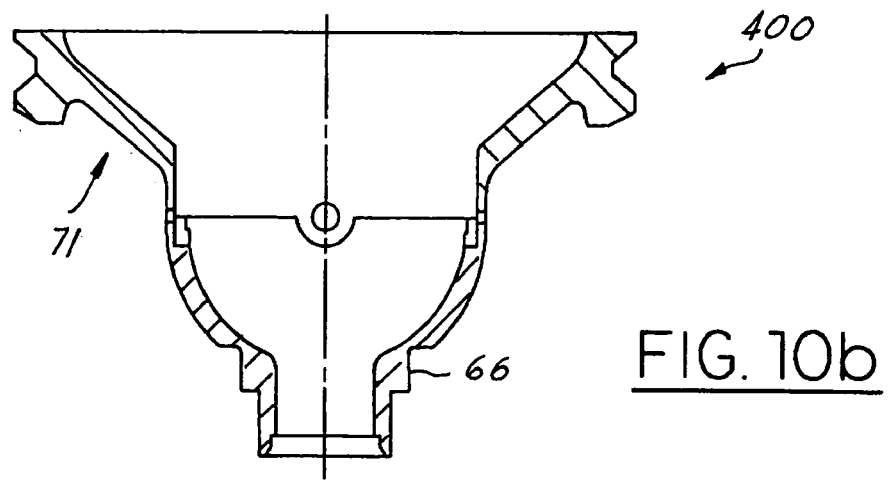
Figure 10C:
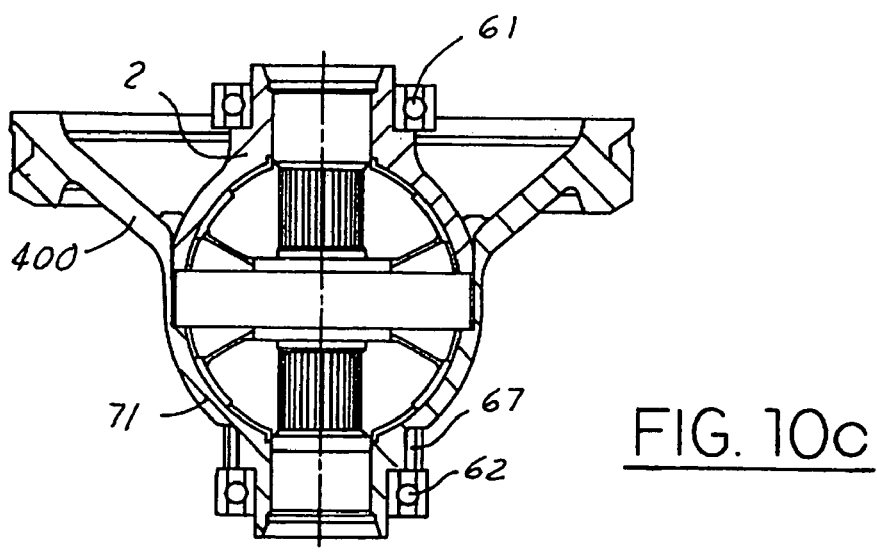

Referring to FIGS. 10a–c, a second embodiment of the differential housing 400 is shown. The housing preform 70 is forged without speed-sensor teeth 34 as described above with respect to the first embodiment. A forged external surface 65 is machined forming an external surface 66 of a housing 71. A speed-sensor gear 67 is pressed into the external surface 66 before the bearings 61 and 62 are fitted.

Figure 11:
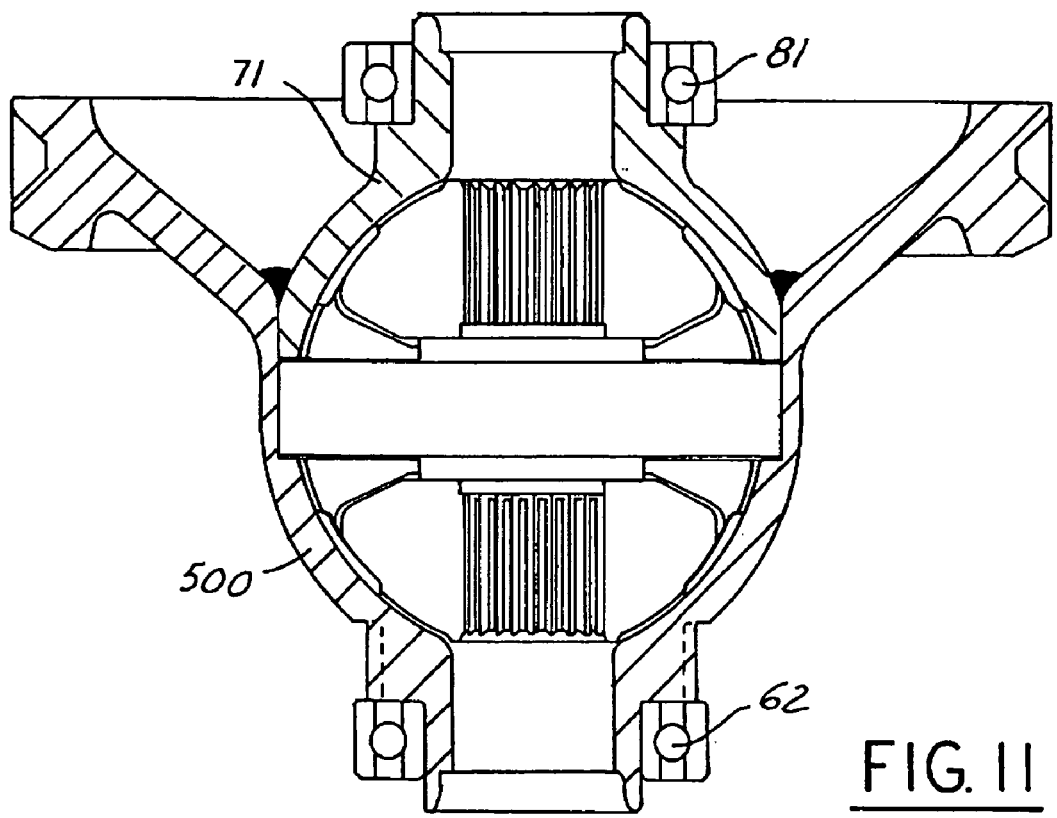
FIG. 11 is a cross sectional view of a third embodiment of the differential housing.
Figure 12:
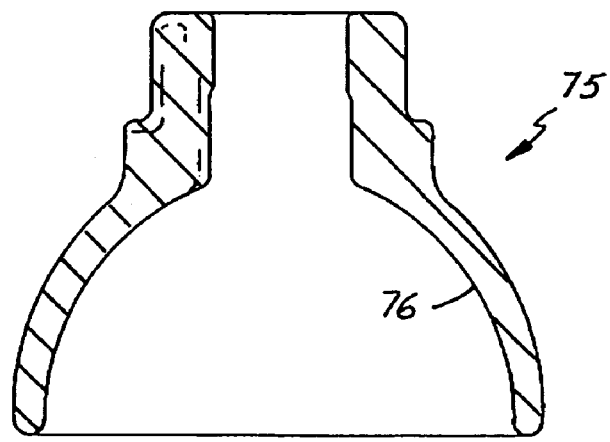
FIG. 12 is a cross sectional view of a housing cover preform according to the third embodiment.

Referring to FIGS. 11 and 12, a third embodiment of the differential housing 500 is shown. The third embodiment of the differential housing 500 differs from the first embodiment of the differential housing 1 in that the forged housing cover 2, shown in FIG. 4, is replaced by a spin-formed or flow-formed housing cover 77. The spin-formed or flow-formed housing cover preform 75 is shown having an inner spherical surface 76 that does not need to be machined after the initial spin-forming or flow-forming process. The dotted line indicates the intended shape of the spin-formed or flow-formed housing cover 77 after machining its exterior to form the final shaped housing cover 77.

Figure 13:
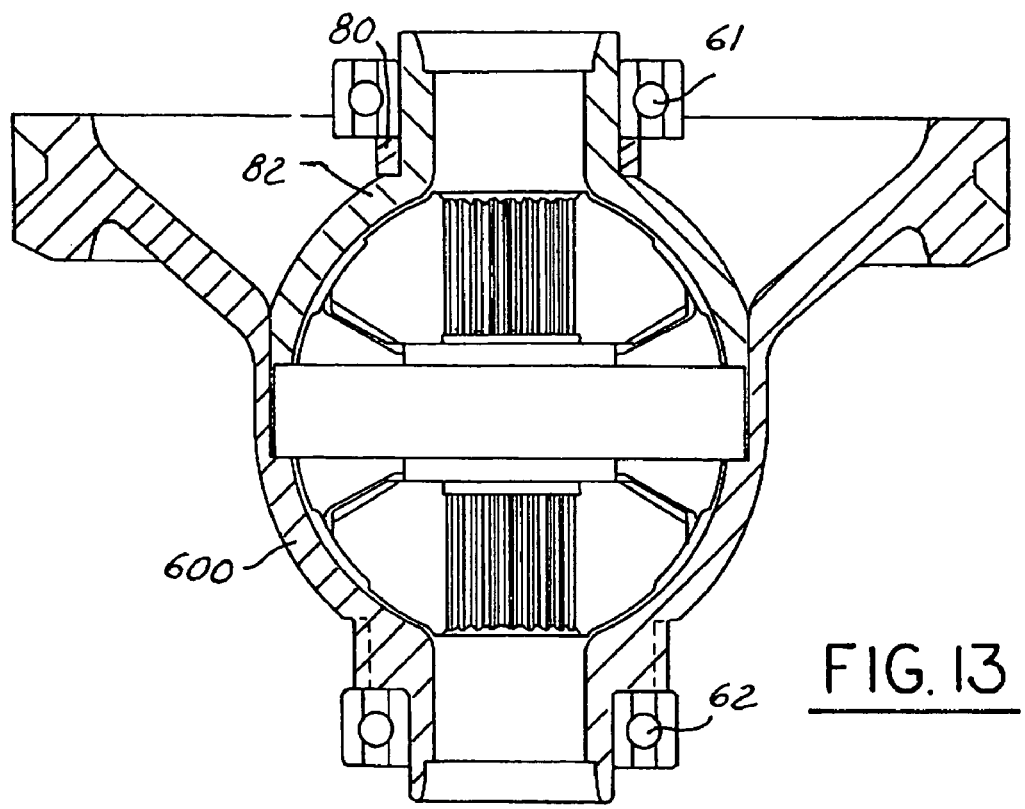
FIG. 13 is a cross sectional view of fourth embodiment of the differential assembly having a stamped housing cover.
Figure 14:
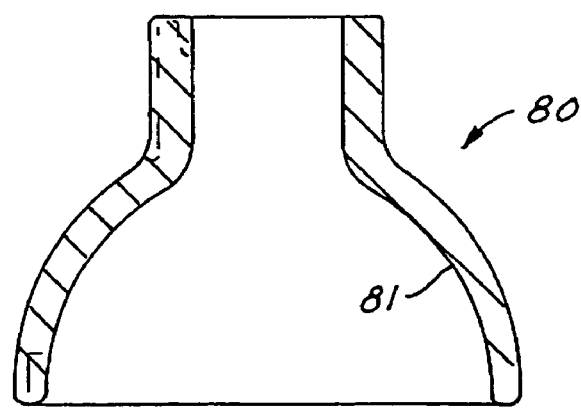
FIG. 14 is a cross sectional view of a stamped housing cover preform according to the fourth embodiment.

Referring to FIGS. 13 and 14, a fourth embodiment of the differential assembly 600 is shown having a stamped housing cover 82. The stamped housing cover preform 80 is shown having an inner spherical surface 81 that does not need to be machined. The dotted line indicates the intended shape of the stamped housing cover 82 after machining.

Figure 17:
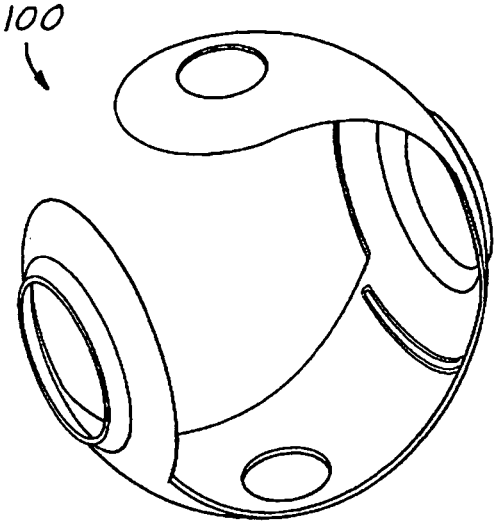
FIG. 17 is a perspective view of a one-piece spherical washer according to one embodiment of the invention.
Figure 18:
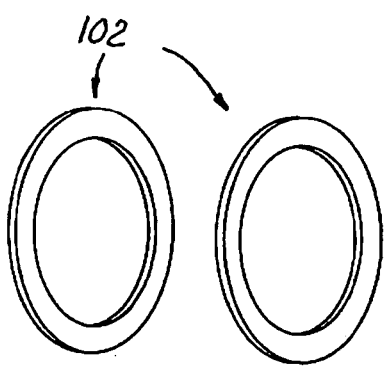
FIG. 18 is a perspective view of flat washers within the differential housing.
Figure 19:
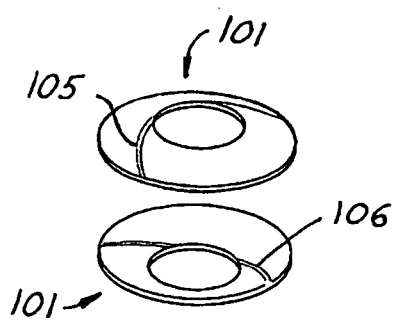
FIG. 19 is a perspective view of spherical washers within the differential housing.

Referring to FIGS. 17–19, there are shown various embodiments of washers 6 and 7. In a first aspect, a one-piece spherical washer 100 is shown in FIG. 17. Preferably, the washer 100 is made of plastic. In FIG. 18, two flat washers 102 are shown. In FIG. 19, two spherical washers 101 are shown having lubrication oil slots 105 and 106 formed, respectively, therein. The materials of washers 101 and 102 may be steel, plastic or any other appropriate material.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A method of making a differential housing assembly having a housing including a ring gear integrally formed therein and a housing cover, said method comprising the steps of:
    forging a conical frustum from a steel rod;
    deforming the frustum between upper and lower die halves of a tool to produce a primary housing preform having an annular rim;
    machining the primary housing preform to form a first external journal surface and an internal spherical surface;
    machining a plurality of teeth in the annular rim defining the ring gear; and
    heat treating and finish machining the primary housing preform to final dimensions.

2. The method of claim 1 including the step of forming a blind hole in the primary housing preform and piercing the blind hole to form a hole.

3. The method of claim 2 wherein the step of machining includes drilling and reaming lubrication oil holes into the primary housing preform.

4. The method of claim 1 including the step of forging a housing cover preform and machining the housing cover preform to an intended final shape, including a second external journal surface.

5. The method of claim 4 wherein the step of assembling includes installing a subassembly comprising bevel gears, bevel pinions, washers, and a pinion shaft inside the housing.

6. The method of claim 5 wherein the step of assembling includes inserting the housing cover within the housing.

7. The method of claim 5 wherein the step of assembling includes fitting ball bearing assemblies onto said first and second journal surfaces onto the housing and housing cover.

* * * * *